United States Patent
Reimann et al.

(10) Patent No.: US 6,226,581 B1
(45) Date of Patent: May 1, 2001

(54) METHOD AND DEVICE FOR CONTROLLING MOTION PARAMETERS REPRESENTING THE MOVEMENT OF A MOTOR VEHICLE MOTION QUANTITY

(75) Inventors: Gerd Reimann, Abstatt; Asmus Volkart, Bietigheim-Bissingen; Michael Schubert, Althengstett; Wolfgang Kraemer, Stuttgart, all of (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/254,197

(22) PCT Filed: Apr. 2, 1998

(86) PCT No.: PCT/DE98/00928

§ 371 Date: May 12, 1999

§ 102(e) Date: May 12, 1999

(87) PCT Pub. No.: WO99/01320

PCT Pub. Date: Jan. 14, 1999

(30) Foreign Application Priority Data

Jun. 30, 1997 (DE) .............................. 197 27 559
Nov. 6, 1997 (DE) .............................. 197 49 005

(51) Int. Cl.⁷ .............................. G06F 7/00; B60R 22/00
(52) U.S. Cl. .............................. 701/48; 701/36; 701/37; 701/70; 701/78
(58) Field of Search .............................. 701/48, 36, 37, 701/41, 70, 71, 72, 1, 77, 78, 79, 74, 82; 303/146, 147; 180/197; 340/459

(56) References Cited

U.S. PATENT DOCUMENTS 5,205,371  4/1993  Karnopp .............................. 180/444
5,281,012  1/1994  Binder et al. ..................... 303/113.5

(List continued on next page.)

FOREIGN PATENT DOCUMENTS 40 30 704  4/1992  (DE) .
40 31 316  4/1992  (DE) .
41 12 388  10/1992  (DE) .

(List continued on next page.)

OTHER PUBLICATIONS

V. Zanten et al., "FDR—die Fahrdynamikregelung von Bosch", ATZ, vol. 96, No. 11, 1994, pp. 674–689. Described in the Specification of the above–identified application.
V. Schramm, "Ein Hochleistungskonzept zur aktiven Fahrwerkregelung mit reduziertem Energiebedarf", ATZ, vol. 94, No. 7/8, 1992, pp. 392–406. Described in the Specification of the above–identified application.

Primary Examiner—Jacques H. Louis-Jacques
(74) Attorney, Agent, or Firm—Kenyon & Kenyon (57) ABSTRACT

Device and method which to control movement quantities representing the movement of the vehicle. The device contains first arrangement for detecting quantities representing the movement of the vehicle. The device has at least two control devices which implement, independently of one another, control actions to stabilize the vehicle with the help of suitable actuators on the basis of quantities detected with the help of the first arrangement. At least one of the control devices influences the steering of the vehicle. Furthermore, at least one of the control devices influences the brakes and/or the engine of the vehicle, and/or an additional control device influences the chassis actuators. In addition, the device has a second arrangement with which signals and/or quantities are determined on the basis of the quantities detected with the first arrangement and used to influence at least temporarily at least one of the minimum of two control devices, so that the vehicle is thereby stabilized. At least one of the minimum of two control devices implements control actions to stabilize the vehicle, without being influenced by the second arrangement until it is influenced by the signals and/or quantities determined with the help of the second arrangement.

21 Claims, 5 Drawing Sheets

U.S. PATENT DOCUMENTS

| | | | |
|---|---|---|---|
| 5,369,584 | * 11/1994 | Kajiwara | 701/48 |
| 5,455,770 | 10/1995 | Hadeler et al. | 701/70 |
| 5,732,371 | * 3/1998 | Fujita | 701/38 |
| 5,790,970 | * 8/1998 | Brachert et al. | 701/70 |
| 5,809,444 | * 9/1998 | Hadeler et al. | 701/72 |
| 5,832,402 | * 11/1998 | Brachert et al. | 701/72 |
| 5,991,669 | * 11/1999 | Dominke et al. | 701/1 |
| 5,999,868 | * 12/1999 | Beno et al. | 701/37 |
| 6,092,006 | * 7/2000 | Dominke et al. | 701/1 |
| 6,097,999 | * 8/2000 | Shal et al. | 701/38 |

FOREIGN PATENT DOCUMENTS

| | | |
|---|---|---|
| 41 40 239 | 6/1993 | (DE) . |
| 42 16 301 | 11/1993 | (DE) . |
| 43 05 155 | 8/1994 | (DE) . |
| 44 46 582 | 8/1996 | (DE) . |
| 0 473 112 | 3/1992 | (EP) . |
| 0 487 967 | 6/1992 | (EP) . |

\* cited by examiner

Figure 2:
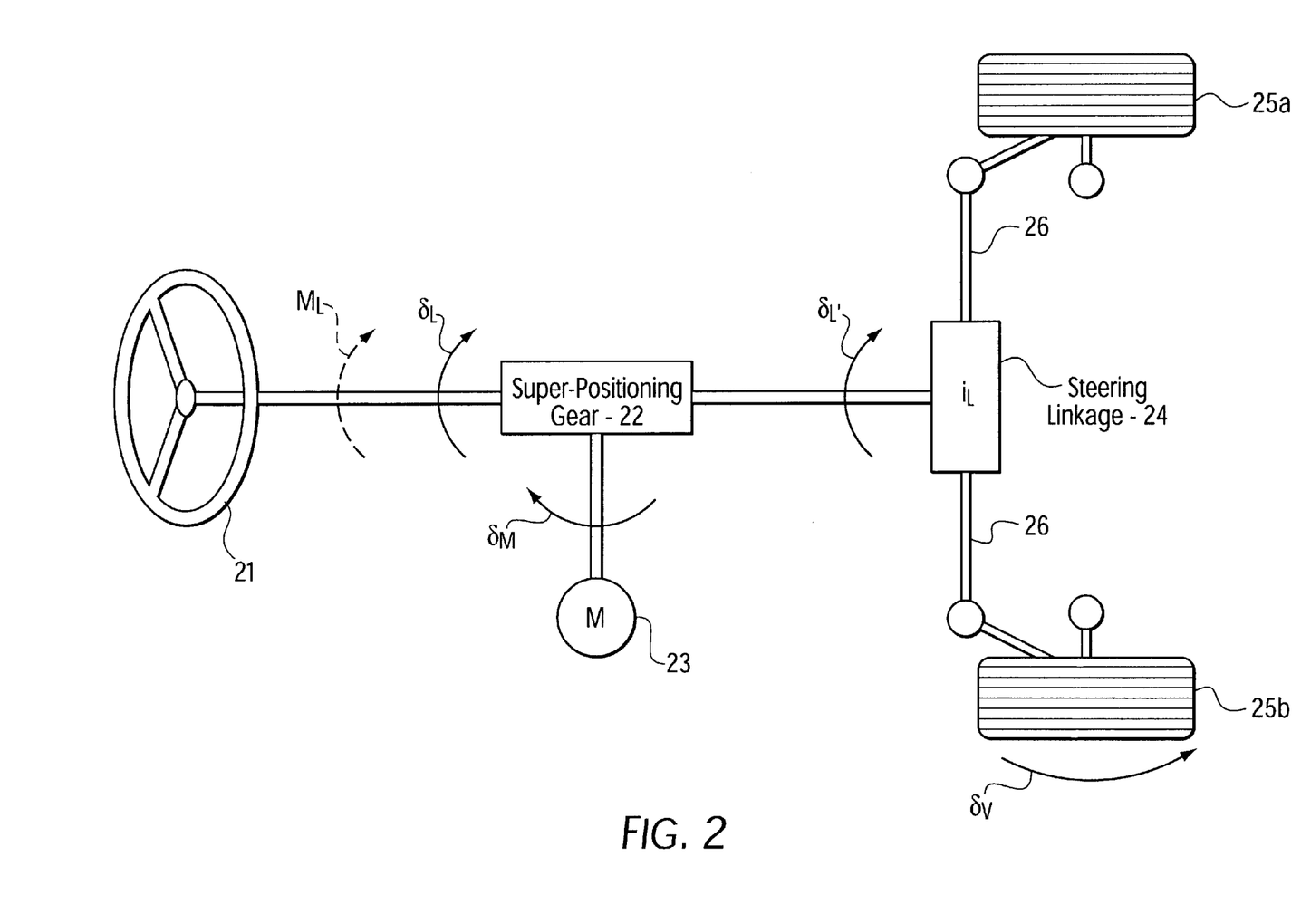
FIG. 2 shows a first schematic diagram of a conventional steering system.
Figure 3:
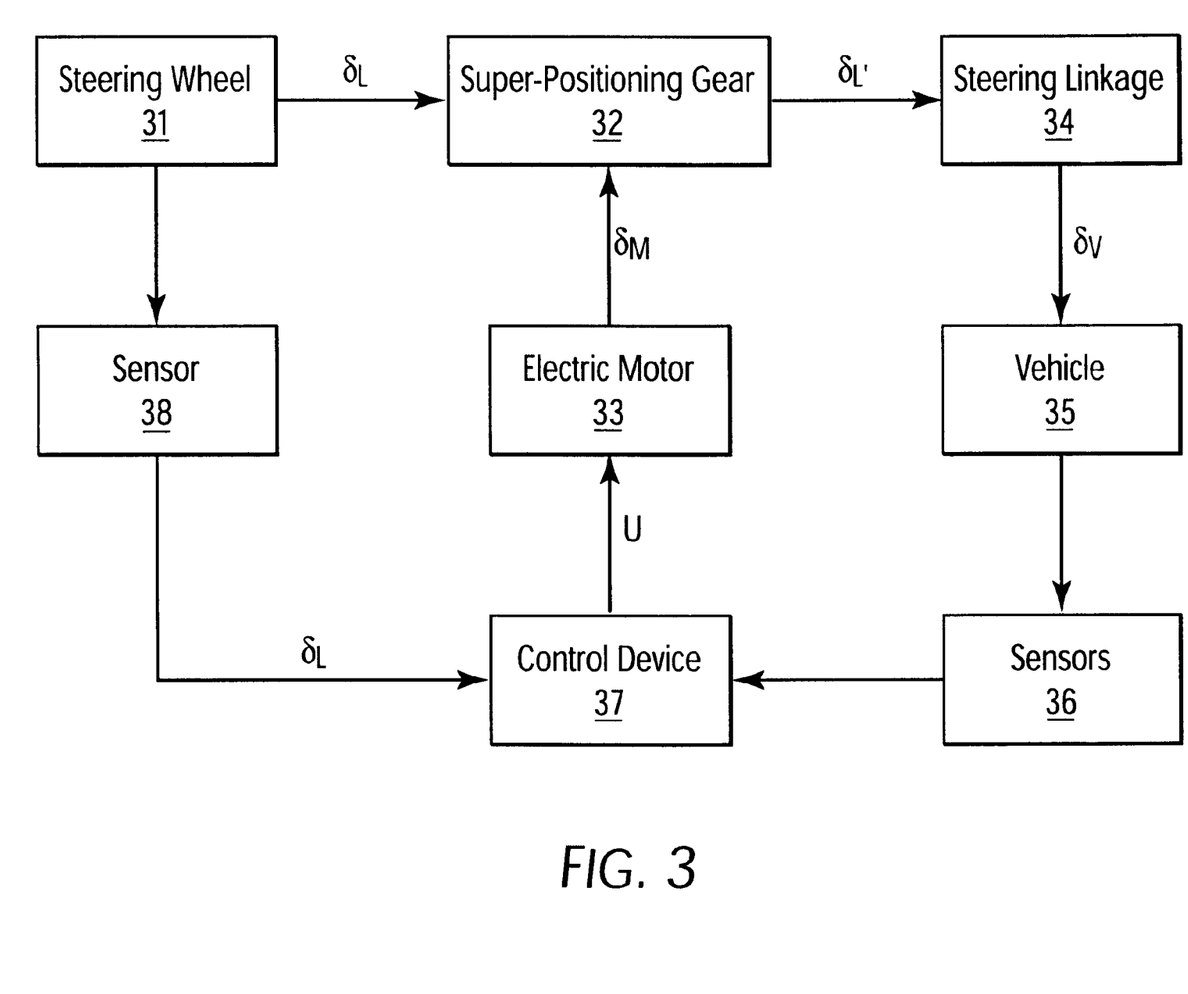
FIG. 3 shows a second schematic diagram of a conventional steering system.

FIG. 5 large steering wheel moments $M_L$ can be achieved. The resulting
very large steering wheel angles $\delta_L$ can be prevented by
superimposing suitable motor angles $\delta_M$, so that the required
output angles $\delta_L'$ can be set with steering wheel angles of the
usual size according to the equation:

$$\delta_L' = \delta_L/i_{ii} + \delta_M$$

METHOD AND DEVICE FOR CONTROLLING MOTION PARAMETERS REPRESENTING THE MOVEMENT OF A MOTOR VEHICLE MOTION QUANTITY

FIELD OF THE INVENTION

The present invention relates to a method and a device for controlling motion parameters representing the movement of a motor vehicle.

BACKGROUND INFORMATION

German Patent Application No. 43 05 155 (corresponding to U.S. Pat. No. 5,455,770) describes a driving dynamics control system having a higher-ranking driving dynamics computer. A braking controller and a rear axle steering controller are subordinate to the vehicle dynamics computer. The subordinate braking controller has a yaw velocity controller and a float angle controller. The subordinate rear axle steering controller has a yaw velocity controller and a float angle limiter. The two controllers, the braking controller and the rear axle steering controller, may operate at the same time.

With the help of measured data acquisition, various quantities are detected, such as the yaw velocity, the float angle, the wheel velocities, the steering angle for the front and rear axles, the longitudinal and transverse velocities of the vehicle and the longitudinal and transverse accelerations of the vehicle. Data obtained by measured data acquisition is available to the vehicle dynamics computer, the subordinate braking controller and the subordinate rear axle steering controller. On the basis of the driving situation, which is described by the data compiled with the help of measured data acquisition, the vehicle dynamics computer defines a setpoint for the yaw velocity and a limit value for the float angle for the vehicle dynamics computer. At the same time, the vehicle dynamics computer notifies the braking controller of the control mode, i.e., whether a yaw velocity control or a float angle control is to be carried out. On the basis of these setpoints, the braking controller initiates control actions for a wheel controller subordinate to it, the wheel controller determining as a function of these actuating signals valve opening times which are converted to wheel brake pressure changes by a suitable hydraulic system. Depending on the setpoints for the braking controller, the vehicle dynamics computer also defines a setpoint for the yaw velocity and a limit value for the float angle for the rear axle steering controller. Furthermore, the vehicle dynamics computer informs the rear axle steering controller which of the two controllers implemented in it is to be operative. The two controllers included in the rear axle steering controller generate signals that characterize the rear axle steering angle and are converted by an appropriate hydraulic system.

German Patent Application No. 40 31 316 (corresponding to U.S. Pat. No. 5,205,371) describes a steering system and will be explained in greater detail below due to its relevance for an understanding of the present invention. With such a steering system, the steering movements imposed by the driver using the steering wheel, steering wheel angle $\delta_L$ detected by a sensor, are superimposed on the movement of an actuator, namely motor angle $\delta_M$ in a superpositioning gear. Resulting superimposed movement $\delta_L'$ is relayed via the steering gear and steering linkage to the front wheels, which are designed to be steerable, to set steering angle $\delta_V$. The actuator may be designed as an electric motor. The operating principle of such a power-assisted steering system is based on the fact that steering can be made very indirect by translation $i_{ii}$ of the superpositioning gear, and thus small Motor angle $\delta_M$ or its setpoint required for steering support is determined from the steering wheel angle $\delta_L$. Motor angle $\delta_M$ depends on signals representing the movements of the vehicle.

German Patent Application No. 44 46 582 describes a control system containing a higher-level controller and a subordinate controller. The higher-level controller generates signals for influencing actuators. These are actuators for applying braking forces to the wheels. Based on the wheel rpm, control signals are formed in the subordinate controller to control actuators with which a braking force can be applied to the wheels. The signals for influencing the actuators are formed with the help of the higher-level controller so that the controlled variable of the higher-level controller is maintained in a setpoint range within two limit values. The higher-level controller has an influence on the actuators only when the controlled variable of the higher-level controller leaves or is outside the setpoint range.

Systems for controlling driving dynamics of the vehicle are known, for example, from the article "FDR—die Fahrdynamikregelung von Bosch" (Controlling Driving Dynamics by Bosch) which was published in the *Automobiltechnische Zeitschrift* (ATZ), vol. 96, no. 11 (1994) pages 674 through 689.

The object of the present invention is to improve upon the control of movement parameters representing the motion of the vehicle.

SUMMARY OF THE INVENTION

The device for controlling motion parameters representing the movement of a vehicle advantageously includes at least two control devices (405, 406, 407) which perform control actions to stabilize the vehicle independently of one another with the help of suitable actuators (409, 410, 413, 416, 417), on the basis of variables that represent the movement of the vehicle and are detected by first means (401).

Advantageously, at least one of the control devices (405) initiates control actions which influence the brakes (410) and/or the engine (409) of the vehicle, and at least one of the control devices (406) initiates control actions which influence the steering (413) of the vehicle, and/or at least one of the control devices (407) initiates control actions which influence the chassis actuators (416) of the vehicle. It may also be advantageous if at least one of the control devices (406) influences the steering (413) of the vehicle with the control actions it initiates, and if at least one of the control devices influences the chassis actuators (416) of the vehicle with the control actions it initiates.

It is advantageous if signals and/or quantities are determined with the help of second means (404), on the basis of the quantities detected with the first means, representing the movement of the vehicle, and these signals and/or quantities are used to influence at least temporarily at least one of the minimum of two control devices so that the vehicle is thereby stabilized. In addition, the control devices are influenced so that they work well together, do not interfere with one another and thus yield a good overall effect with regard to stabilization of the vehicle. At least one of the minimum of two control devices performs control actions to stabilize the vehicle without being influenced by the second means until it is influenced by the signals and/or quantities determined with the help of the second means.

It is advantageous that the device contains third means (402, 403) to which are sent the quantities representing the movement of the vehicle as detected by the first means. With the third means, quantities describing the driving status of the vehicle and/or quantities describing the setpoints selected by the driver are determined on the basis of the quantities representing the movement of the vehicle. The quantities describing the driving status of the vehicle and/or the quantities describing the setpoints selected by the driver are sent to the second means for determining the signals and/or quantities with which at least one of the minimum of two control devices is influenced at least temporarily.

The control devices (405, 406, 407) preferably each have at least controller means (408, 411, 414) and/or means (412, 415, 418) for driving actuators (409, 410, 413, 416, 417) assigned to the respective control devices and/or they have actuators assigned to the respective control devices.

Signals and/or quantities that are sent to the means (412, 415, 418) for driving the actuators (409, 410, 413, 416, 417) assigned to the respective control device are advantageously generated with the controller means (408, 411, 414) at least on the basis of the quantities detected with the first means and the signals and/or quantities sent to them by the second means. Likewise, the means for driving actuators assigned to the respective control device preferably generate signals and/or quantities for driving the actuators assigned to the respective control device at least on the basis of the signals and/or quantities sent to them by the controller means and the quantities detected with the first means.

It has proven advantageous if each of the controller means (408, 411, 414) has at least controller influencing means (408a, 411a, 414a) and/or a controller (408b, 411b, 414b) for implementation of a characteristic control for the control device and/or means (411c, 414c) for implementation of additional control actions.

Signals and/or quantities that are used to influence the respective controller (408b, 411b, 414b) are advantageously determined with the controller influencing means (408a, 411a, 414a) at least on the basis of the quantities and/or signals determined with the second means. Likewise, at least on the basis of the quantities and/or signals determined with the controller influencing means, the controller advantageously determines signals and/or quantities that are sent to the means (412, 415, 418) for driving the actuators assigned to the respective control device.

It is especially advantageous that signals and/or quantities that are sent to the means (412, 415, 418) to drive the actuators assigned to the respective control device are determined with the means (411c, 414c) for implementation of additional control actions at least on the basis of the quantities detected with the first means, with these signals and/or quantities being determined in the means for implementation of additional control actions independently of the signals and/or quantities determined with the second means.

It is also advantageous if the quantities and/or signals determined with the second means include:

signals with which individual control devices are enabled and/or blocked and/or with which the enabling of the control devices is influenced, and/or quantities, in particular variable gain factors, with which the control actions of the individual control devices are increased and/or decreased, and/or quantities, in particular intervention thresholds for determining beyond which value of a system deviation, which is determined in the controller present in the control device, control actions are to be taken, and/or quantities, in particular maximum values, with which the control actions are limited, and/or quantities which are setpoints for the controllers, and/or quantities by means of which the control procedure taking place in the controller is preselected or altered.

The control device (406), which intervenes in the steering (413) of the vehicle with the control actions it performs, advantageously has:

a controller means (411) which has a controller influencing means (411a), a controller (411b) for performing steering actions that stabilize the vehicle and a means (411c) for implementation of additional steering actions, and means (412) for driving a steering actuator, and a steering actuator (413).

The control device (405), which influences the brakes (410) and/or the engine (409) of the vehicle with the control actions implemented by it, advantageously has:

a controller means (408) having a controller influencing means (408a) and a controller (408b) for implementing braking measures and/or engine measures to stabilize the vehicle, and means (418) for driving the brakes (410) and/or the engine (409), and the brakes (410) and/or the engine (409) as actuators.

The control device (407), which intervenes in the chassis actuators (416) of the vehicle with the control actions performed by it, advantageously has:

a controller means (414) which has a controller influencing means (414a), a controller (414b) for performing chassis actions to stabilize the vehicle and a means (414c) for implementing additional chassis measures, and means (415) for driving the chassis actuators (416) and the chassis actuators (416).

Additional advantages of the device and the method according to the present invention include:

Hierarchic modular coordination of various subsystems (405, 406, 407) which influence the transverse dynamics of the vehicle, in particular the stability of the vehicle in driving.

Each subsystem (405, 406, 407) has its own controller FZR (408b, 411b, 414b).

Controllers FZR of all subsystems can operate at the same time.

Controllers FZR of the subsystems can function autonomously and do not cause mutual interference in certain driving situations, e.g., in normal operation.

Coordination by a system coordinator (404) serves to achieve the best possible driving performance, which cannot be achieved with the subsystems functioning independently of one another. At the same time, mutual interference of the subsystems or counterproductive functioning is prevented in all driving situations.

The system coordinator influences controllers FZR of the subsystems on the basis of the instantaneous driving situation or the driving status and the driver's intentions.

The subsystems whose measures are most effective in the given situation are implemented by this coordination.

This is an open structure which can easily be adapted to various system configurations. If a subsystem is added, eliminated or altered, it is only necessary to adjust the system coordinator, while the other subsystems, including their controllers FZR, remain unchanged.

In the event of failure of subsystems, the other subsystems can continue to operate autonomously without coordination. In this case, the functions of the subsystems which are still functional might be restricted to prevent mutual interference.

If emergency functions are provided in the system coordinator, the subsystems that are still functioning can operate in a coordinated manner in the event of failure of subsystems.

In the event of failure of the system coordinator, the subsystems can continue functioning autonomously. In this case, the functions of subsystems that are still functional may be restricted to prevent mutual interference.

The subsystems may essentially autonomously carry out additional functions (411c, 414c) that need not be coordinated.

The system coordinator may have an internal hierarchic structure.

The various functions of the system as a whole may be distributed in any desired manner among multiple control units or processors that communicate with one another or they may be carried out by an efficient central control unit or processor.

DETAILED DESCRIPTION

Figure 1:
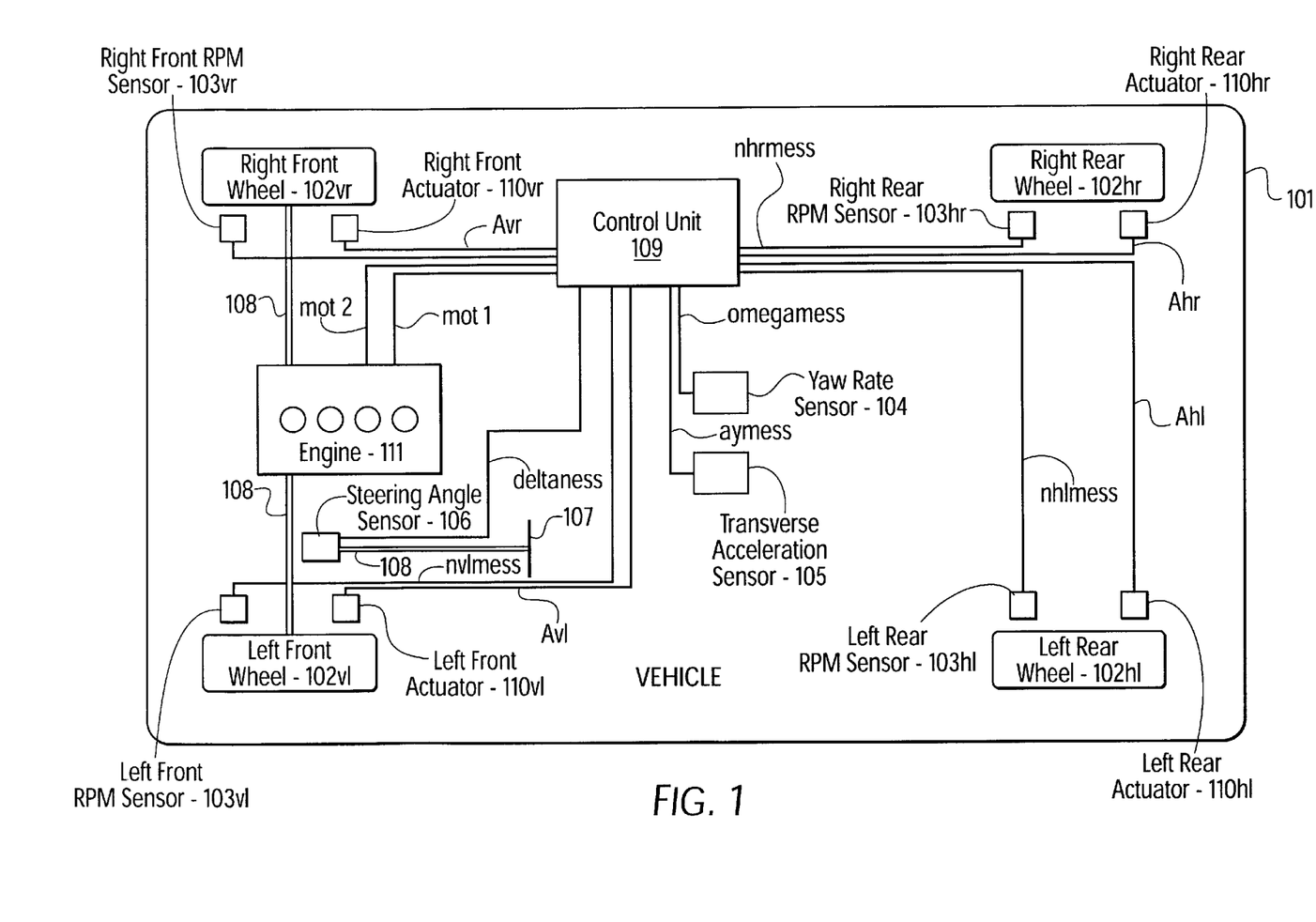
FIG. 1 shows as an exemplary conventional system for controlling driving dynamics of a vehicle.

FIG. 1 shows a conventional system for controlling the driving dynamics of a vehicle. Such system can to be used as a control device in the device according to the present invention.

FIG. 1 shows a vehicle 101 with wheels 102vr, 102vl, 102hr and 102hl. The simplified notation 102ij is used below for the wheels of the vehicle, where the index i indicates whether the wheel is on the rear axle (h) or on the front axle (v) and the index j indicates whether the wheel is on the right (r) or left (l) side of the vehicle. This characterization by the two indices i and j is provide for all quantities or components shown in FIG. 1.

A wheel rpm sensor 103ij is assigned to each wheel 102ij. Signal nijmess generated by respective wheel rpm sensor 103ij is sent to a control unit 109. In addition to wheel rpm sensors 103ij, additional sensors are also provided in vehicle 101. These include a rotational rate or yaw rate sensor 104, whose signal omegamess is also sent to control unit 109. In addition, there is a transverse acceleration sensor 105. Signal aymess generated by it is also sent to control unit 109. In addition, a steering angle sensor 106, with which at least the steering angle set by the driver on the front wheels using steering wheel 107 and steering linkage 108 is detected, is also provided in the vehicle. Signal deltamess detected by steering angle sensor 106 is sent to control unit 109. Instantaneous engine characteristics mot1 such as engine rpm and/or throttle valve setting and/or firing angle are sent from engine 111 to control unit 109.

In control unit 109 the signals supplied to it are processed and/or analyzed, and actuating signals are output in accordance with the control of the driving dynamics of the vehicle. It is conceivable for control unit 109 to generate actuating signals Aij with which actuators 110ij that are assigned to wheels 102ij and are preferably brakes can be influenced. In addition, output of an actuating signal mot2 with which the driving moment delivered by engine 111 can be influenced is also conceivable.

The steering system known from the related art and illustrated in FIGS. 2 and 3 is described below. Such system can be used as a control device in the device according to the present invention.

FIGS. 2 and 3 show a steering wheel 21 or 31 which can be operated by the driver of the vehicle. Due to the operation of steering wheel 21 or 31, steering wheel angle $\delta_L$ or steering wheel moment $M_L$ is sent to superpositioning gear 22 or 32. At the same time, motor angle $\delta_M$ of actuator 23 or 33 is sent to superpositioning gear 22 or 32, where the actuator may be designed as an electric motor. At the output end of superpositioning gear 22 or 32, superimposed motion $\delta_L'$ is sent to steering linkage 24 or 34, which in turn sends steering angle $\delta_V$ or steering moment $M_V$ to steerable wheels 25a and 25b over steering linkage 26 according to total angle $\delta_L'$. FIG. 3 also shows sensors 38 and 36, with sensor 38 detecting steering wheel angle $\delta_L$ and sending it to control unit 37, while 36 denotes sensors which sense the movements of vehicle 35 (for example, yaw movements, transverse acceleration, vehicle velocity, etc.) and send them to control unit 37. Control unit 37 determines a manipulated variable u for driving actuator 23 or 33, depending on steering wheel angle $\delta_L$ detected and optionally depending on the movements of the vehicle.

The method and device according to the present invention are described in general below.

The transverse dynamic behavior of a vehicle, in particular the driving stability, can be actively influenced by various systems or possibilities of intervention. If a vehicle has a plurality of such systems, the various systems must not operate independently of one another, but instead the measures must be coordinated to achieve the best possible driving performance. A modular hierarchic structure is proposed for this coordination task.

Various systems can be used to stabilize driving:

Systems for controlling the driving dynamics of a vehicle (FDR). With these systems, the longitudinal forces acting on the wheels are altered by braking measures and engine measures. Such a system is described, for example, in the article "FDR—die Fahrdynamikregelung von Bosch" (FDR—Control of Driving Dynamics by Bosch) which was published in the Automobiltechnische Zeitschrift (ATZ), vol. 96, no. 11 (1994) pages 674 through 689.

Systems for electronic braking force distribution. Wheel braking forces are also altered with these systems. Such a system is described, for example, in German Patent No. 41 12 388 (corresponding to U.S. patent application No. 5,281,012).

Driving dynamics steering systems (FLS). With these systems, the transverse force on the front axle is altered by modifying the steering angle. Such a system is described, for example, in German Patent Application No. 40 31 316 (corresponding to U.S. Pat. No. 5,205, 371).

Systems for rear wheel steering. With these systems, the transverse force acting on the rear axle is altered by setting a steering angle on the rear axle. Such a system is described, for example, in the contribution titled "Servoantriebe für Vorder- und Hinterradlenkungen in Personenwagen", (Servo drives for front- and rear-axle steering in passenger vehicles) on Nov. 28/29, 1989 at the "Four Wheel Drive" Convention at the Haus der Technic in Essen.

Active chassis systems in the form of active stabilizers, for example. With these systems, the wheel contact forces and thus also the forces acting parallel to the road surface are influenced. Such a system is described, for example, in the article "Ein Hochleistungskonzept zur aktiven Fahrwerkregelung mit reduziertem Energiebedarf" in the *Automobiltechnische Zeitschrift (ATZ)*, vol. 94, (A high performance concept for active chassis control with reduced power demand) no. 7/8 (1992) pages 392 through 406.

Active differential gear for influencing the wheel drive forces.

The systems listed above as they have traditionally been used in a vehicle, operated mostly independently of one another. This has not led to optimum vehicle performance.

One approach to coordinate the control strategies implemented by various control systems involves having all the available control actions determined by a very powerful vehicle controller. Although this leads to optimum performance in theory, there are many problems in practice:

Controller structure too complicated.

Controller design expensive.

Application is difficult.

A complete controller must be designed and applied for each combination of systems and actions.

The entire system must be shut down in failure of a subsystem.

These disadvantages are to be avoided by the present invention.

The device according to the present invention for carrying out the method according to the present invention is described below with reference to FIG. 4.

Figure 4:
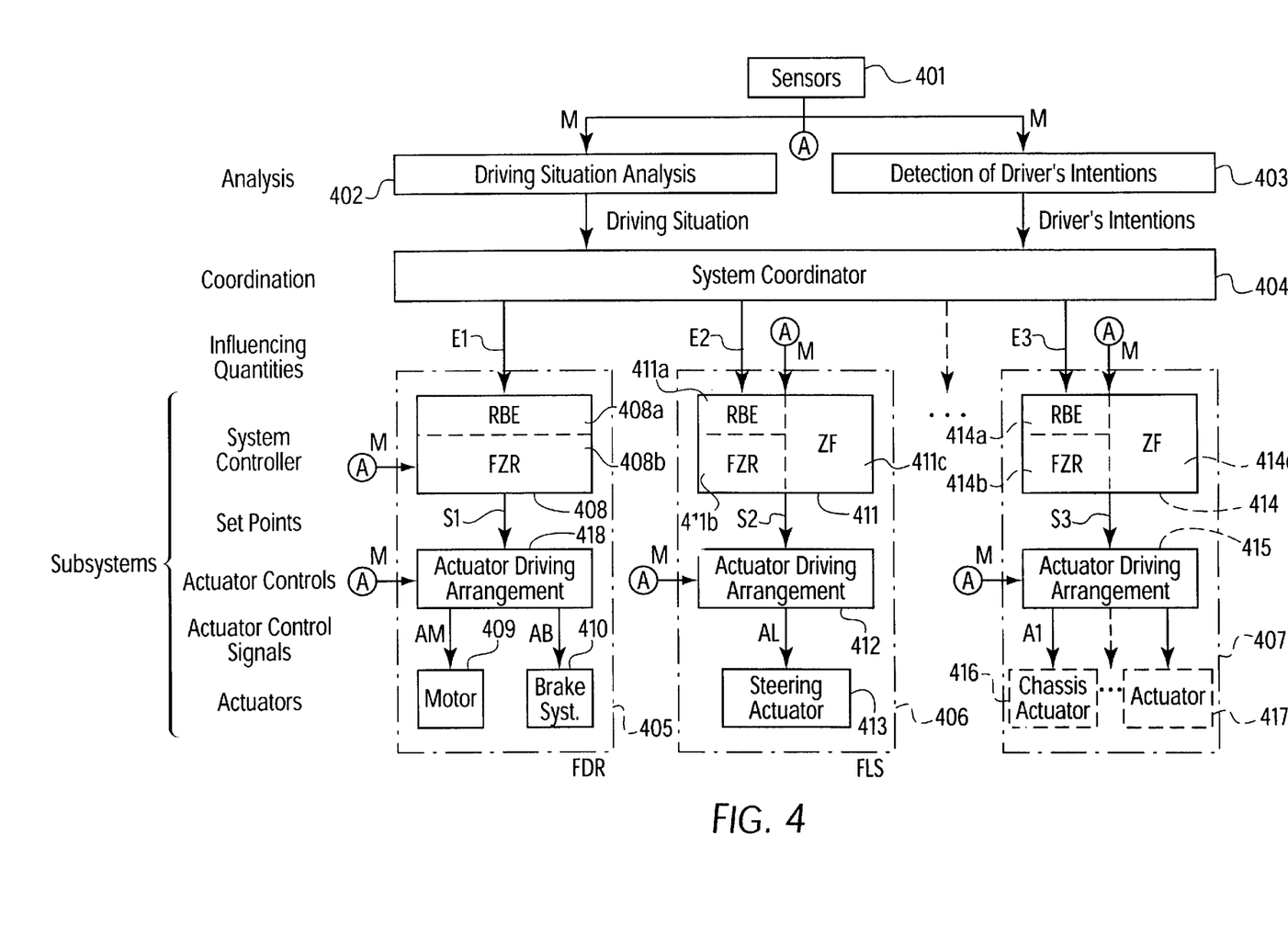
FIG. 4 shows a block diagram of a device according to the present invention for implementing a method according to the present invention.

FIG. 4 shows an exemplary modular structure of the device according to the present invention for coordination of various systems for influencing the transverse dynamics of the vehicle in the form of a block diagram.

The structure is divided into the higher-order levels of analysis, formed by blocks 402 and 403, and the coordination, formed by block 404, and individual systems 405, 406, . . . 407, which are referred to as subsystems or control devices.

The subsystems or control devices are in turn divided into subsystem controllers or controlling means, actuators and actuator controls or means for driving actuators assigned to the respective control devices.

The system illustrated in FIG. 4 is an open system, where subsystems or control devices of various types in differing numbers can be coordinated. For example, it may be assumed that in FIG. 4 there is at least one system for controlling the driving dynamics of the vehicle (FDR), acting on the engine and brakes of the vehicle, and a driving dynamic steering system (FLS). Furthermore, additional systems, such as a system for active chassis control, may also be added.

Block 401 shown in FIG. 4 depicts the various means (e.g. arrangements) present in a vehicle for detecting the quantities representing the motion of the vehicle. For example, block 401 contains the sensors listed in FIGS. 1, 2 and 3. The quantities representing the motion of the vehicle detected with the help of the various sensors are indicated with M.

Quantities M detected with the help of block 401 are sent as input quantities to a block 402 for driving situation analysis, block 403 for detection of the driver's intentions, and to various controlling means 408, 411 and 414 as well as actuator controls 412, 415 and 418.

The concept of quantities M is to be interpreted here in a general sense. In addition to the above-mentioned quantities and/or signals detected with the help of sensors, these quantities may also be processed, e.g., filtered or monitored, sensor signals or quantities derived from sensor signals, e.g., estimates. Of course, all the components mentioned above need not have access to all quantities M. Instead, there may be two alternatives with regard to the availability of quantities M. Either all quantities M are supplied to the above-mentioned components, and from these quantities M the components select only the quantities needed for the internal processing, or only the quantities contained in quantities M and needed for internal processing are supplied to the above-mentioned components. In the latter case, only quantities M needed to perform the functions implemented in them are supplied to the individual components.

The diagram shown in FIG. 4 corresponds to the first alternative. To represent the second alternative, appropriately indexed symbols would have to be used instead of symbol M in FIG. 4.

A particular feature of the structure of the device according to the present invention is that each subsystem or each control device has its own vehicle control FZR or its own controller FZR. Various controllers FZR 408b, 411b and 414b control one or more quantities which characterize the dynamic performance of the vehicle. This may be, for example, the yaw velocity, the transverse acceleration, the float angle or the road curvature. Some or all of controllers FZR 408b, 411b and 414b may also be open-loop controllers. (No further distinction is made below between open- and closed-loop controllers.)

On the basis of quantities M, controllers FZR 408b, 411b, 414b determine the actions with the help of their respective control procedures, i.e., they determine setpoints SR contained in signals S for the respective actuator controls or means for driving the actuators, assigned to the respective control devices, of their subsystems or their control devices.

It should be noted that the notation SR stands for the respective setpoints generated in controllers 408b, 411b, 414b. Likewise, notation S represents the signals sent from the controller means to the actuator controls. In this connection, reference is made to FIG. 5, to be described below.

The driving performance of the vehicle is influenced by setpoints SR. These setpoints SR are sent from controller 408b to a means 418 for driving actuators assigned to control device 405, from controller 411b to a means 412 for driving actuators assigned to control device 406, and from controller 414b to a means 415 for driving actuators assigned to control device 407. As mentioned above, setpoints SR are not shown explicitly in FIG. 4, but instead are contained in signals S. Furthermore, signals SF generated by means ZF, which might be present in the control devices, are also present in signals S, as shown by the diagram in FIG. 5. For a detailed diagram, reference is made here to FIG. 5, which shows control device 407 and in particular controller means 414 contained in it in more detail.

Controllers FZR 408b, 411b and 414b may function autonomously, i.e., independently of one another. Furthermore, they do not need any specifications by block 404, i.e., by the system coordinator, to determine setpoints SR. In other words, controllers FZR 408b, 411b and 414b, and with them also the respective subsystems or control devices 405, 406 and 407, can perform their control actions to stabilize the vehicle without being influenced until they are influenced by the signals and/or quantities E determined with the help of block 404, the system coordinator. In other words, setpoints or limit values, for example, can be preselected for subsystems 405, 406, 407 and with them controllers FZR 408b, 411b and 414b, by block 404 if required on the basis of the vehicle situation. If the vehicle situation allows, however, no such influencing of block 404 occurs on blocks 405, 406, 407 through quantities E, so that control devices can perform their control actions undisturbed according to the uninfluenced control procedures implanted in them. It should be noted that notation E is intended to include quantities E1, E2, E3 shown in FIG. 4.

Furthermore, controllers FZR 408b, 411b and 414b are designed so that they do not interfere with one another and do not function against one another in certain driving situations, i.e., mainly in normal operation.

To achieve a good interaction and thus the best possible driving performance and to prevent mutual interference of the subsystems in all driving situations, these measures are coordinated by a system coordinator, block 404.

System coordinator block 404 has the opportunity to intervene in corresponding control device 405, 406 and 407 through quantities E, or more precisely, to intervene in the corresponding subsystem controller or corresponding controller means 408, 411, 414. With quantities E1 it can intervene in control device 405, with quantities E2 it can intervene in control device 406, and with quantities E3 it can intervene in control device 407. Therefore, the respective controller influencing means RBE 408a, 411a, 414a are influenced with quantities E1, E2 and E3. From quantities E supplied to them, these controller influencing means RBE generate quantities R1, R2 and R3, which are sent to respective controllers FZR 408b, 411b and 414b.

The diagram in FIG. 4 shows that individual quantities E1 and/or E2 and/or E3 are sent to each controller influencing means RBE 408a, 411a, 414a. As an alternative, it is also conceivable for the system coordinator to output a single quantity E for all controller influencing means RBE, and for controller influencing means RBE to select quantities E which they require.

Figure 5:
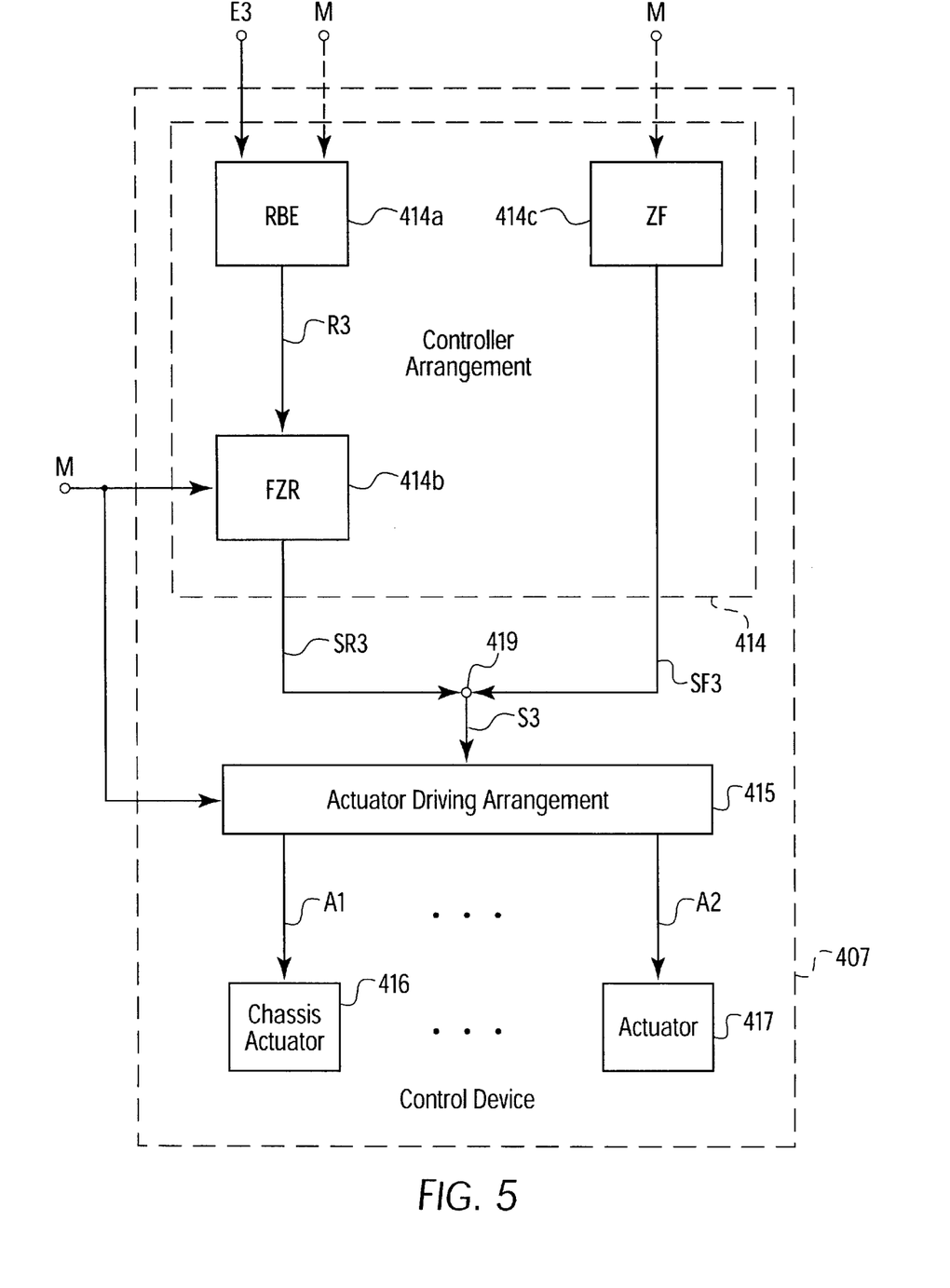
FIG. 5 shows an exemplary design of a control device according to the present invention.

Above-mentioned controller influencing means RBE 408a, 411a, 414a are provided on the part of subsystem controllers or controller means 408, 411, 414. These controller influencing means convert quantities E generated by system coordinator 404 into subsystem-specific control types. Reference is made here to FIG. 5, which is described in greater detail below.

Quantities E with which the subsystems or control devices can be influenced or influencing quantities generated by system coordinator 404 may include:

Enabling signals with which the enabling of controller means 408, 411, and 414 is influenced. Since two different structures are provided in principle for the controller means according to FIG. 4, two different variants of influencing the enabling are conceivable here. If the controller means have only one controller influencing means RBE and one controller FZR (see controller means 408, for example), then controller FZR is enabled by the enabling signal and thus the controller means is enabled at the same time. In this case, the enabling of controller FZR corresponds to the enabling of the controller means. However, if the controller means has a controller influencing means RBE, a controller FZR and means ZF for carrying out additional functions, as shown by controller means 414, for example, then the enabling of the controller means is no longer directly associated with the enabling of controller FZR. Means ZF functions independently of the enabling of controller FZR, which is why the controller means can generate signals S even if controller FZR has not been enabled. It should be pointed out here that "enabling" of a controller is to be understood as enabling or permitting or making possible actions by the controller.

Quantities acting as variable gain factors with which the actions by controllers FZR are increased or decreased.

Quantities, in particular action thresholds, with which a determination is made about which value of a system deviation, which is determined in the controller in the control device, is to be the limit beyond which control actions are to be taken.

Quantities, in particular maximum values, with which the control actions are limited.

Quantities representing setpoints for controllers FZR.

Quantities by which the control procedure taking place in controller FZR is specified and/or altered. If the control procedure is implemented in the form of PID control, for example, it is conceivable to provide different weighting for the individual control components, i.e., the proportional component, the integral component and the differential component by specifying appropriate coefficients. For example, this may also lead to one component being removed completely.

The influencing quantities or the quantities E for different subsystems should correspond with regard to their physical and logical meanings, or the same influencing quantities or quantities E should be used for multiple subsystems. The setpoints should be mentioned here as examples.

System coordinator 404 defines the influencing quantities on the basis of the results of a driving situation analysis taking place in block 402 and on the basis of recognition of the driver's intentions, which takes place in block 403.

In the analysis of the driving situation taking place in block 402, quantities describing the driving status of the vehicle are determined from quantities M, which represent the movement of the vehicle and are determined with the help of block 401. These quantities, labeled as the driving situation in FIG. 4, are sent to system coordinator 404. These quantities can be considered actual values.

These quantities may be, for example, the wheel speeds, the vehicle speed, the transverse acceleration acting on the vehicle, the yaw of the vehicle about its vertical axis, the float angle of the vehicle, the inclined position angle on the front and rear axles, the tire forces, the wheel brake cylinder pressures or the slip of the respective wheel and other quantities. Some of these quantities are detected directly with the help of sensors. These quantities are not normally modified in block 402; they are more or less "looped through" block 402 unchanged from means 401. This may be, for example, the yaw, the transverse acceleration or the wheel speeds. Other quantities such as the float angle or the inclined position angle are obtained from corresponding input signals by modeling, for example.

Furthermore, it should also be noted that the driving situation analysis taking place in block 402 also analyzes the status of the environment in addition to the status of the vehicle on the basis of measured quantities. In particular, it recognizes whether the vehicle is already in or is approaching the dynamic extreme range, i.e., it determines the extent of the reserve based on the coefficient of friction $\mu$. In addition, it detects ambient conditions, such as the coefficient of friction $\mu$ between the road surface and the tires, a road surface with different coefficients of friction (split $\mu$) in relation to the vehicle sides and the depletion of the transverse force potential of the vehicle, for example.

In the recognition of the driver's intentions which takes place in block 403 quantities describing the selections made by the driver are determined from quantities M, which are determined with the help of block 401 and represent the motion of the vehicle and operation of the vehicle. These quantities, represented as the driver's intentions in FIG. 4, are sent to system coordinator 404. These quantities can be considered setpoints. These quantities may include, for example, the setpoint yaw, the steering angle set by the driver, setpoints for the longitudinal and transverse acceleration of the vehicle, setpoints for the deceleration of the vehicle, the preliminary pressure set by the driver and additional quantities.

In summary, it can be concluded that recognition of the driver's intentions deduces the desired movement of the vehicle from the driver's actions. The driver's actions are determined on the basis of the measurement of quantities set by the driver using the vehicle's operating elements, such as the steering wheel angle, the preliminary pressure or the brake pedal position and the gas pedal position. For example, the position of the brake pedal or the position of the gas pedal yield values for the vehicle's acceleration or deceleration. The transverse acceleration can be determined by modeling from the steering angle, for example, in a known manner. It is also conceivable to detect one quantity or the other directly with the help of a sensor.

It should be noted that different quantities are needed to describe the action of the driver with regard to the respective brake system, depending on the brake system implemented in the vehicle. Different brake systems may be used for subsystem 405. A hydraulic brake system such as that known, for example, from the article "FDR—die Fahrdynamikregelung von Bosch" published in *Automobiltechnische Zeitschrift (ATZ)*, vol. 96, no. 11 (1994) pages 674–689, may be used. Furthermore, an electrohydraulic brake system, such as that known from International Patent WO 97/00433 may also be used. As an alternative to hydraulic brake systems, pneumatic or electro-pneumatic brake systems may be used. In addition, an electric motor brake system may be used, where the braking force is generated directly by servo motors connected to the brake shoes and/or the brake linings.

Depending on what type of brake system is used, at least the preliminary pressure set by the driver or a quantity describing the pedal position or both quantities together are necessary to describe the driver's action.

The system coordinator determines from the signals for the driving situation and the driver's intentions which subsystems and which control devices are most suitable and how they should act to achieve the desired driving performance in the given driving situation.

In addition to vehicle control, which is implemented mainly by controller FZR, the subsystems or control devices 405, 406, 407 may perform additional functions ZF. To this end, controller means 411 or 414, for example, include blocks ZF 411*c* or 414*c*. The actions by blocks ZF or means 411*c* or 414*c* to implement additional control measures need not be coordinated. This is the case in particular because they have little or no influence on the transverse dynamics of the vehicle, for example. These additional functions or these additional control actions implemented with the help of means 411*c* or 414*c* may be comfort functions, for example.

With controller means 406, which is a dynamic steering system (FLS), the relationship between the steering wheel angle set by the driver on the steering wheel and the wheel steering angle set on the steerable wheels on the basis of the driver's selection can be modified as a function of the vehicle speed by means 411*c*. With controller means 407, which may be an active chassis control, for example, leveling of the vehicle in cornering can be achieved, for example, with the help of means 414*c*. This means that due to the active chassis control in and during cornering, the chassis actuators are influenced in a known manner so that the vehicle does not exhibit any rolling motion.

Means ZF 411*c* and 414*c* are not influenced by system coordinator 404, and instead they are designed to be completely independent of the subsystem controllers or controller means 411 or 414. Of course the additional functions may also be controlled by open-loop control instead of closed-loop control. Setpoints S of a subsystem or a control device are thus determined by controllers FZR of the subsystem as well as by means ZF, if present, for implementing additional control actions of this subsystem. Reference should be made here to FIG. 5 which shows the state of affairs described above.

The subsystem (FDR) or control device 405, which acts on the brakes and/or the engine of the vehicle with the control actions it performs, preferably selects setpoints for the wheel moments, wheel moment changes, wheel slip or wheel slip changes. With the help of an actuator control or a means 418 for driving actuators assigned to control device 405, these setpoints S1 are converted in a known way into corresponding signals AM for influencing engine 409 or signals AB for influencing brakes 410. An advantageous division would be one such that rapidly required changes are implemented with the help of the brakes, while changes that are not required as rapidly are implemented with the help of the engine.

The following brake systems are conceivable as the brake systems for use here: a hydraulic or electrohydraulic brake system, with hydraulic valves being driven with the help of signals representing control times—with the electrohydraulic brake system, these signals also include at least the preliminary pressure generated by the driver and a signal representing the pedal path of the brake pedal; a pneumatic or electropneumatic brake system, with pneumatic valves being driven with the help of signals representing control times; an electromotor brake system with the actuators being servo motors connected to the brake shoes and/or brake linings and driven with a control signal representing an electric current.

It should be noted that signals AM, AB, AL and A in FIG. 4 are designated in general as actuator control signals. Starting with signal AM, the torque delivered by engine 409 is altered via a change in the throttle valve setting, for example. With the help of signal AB, representing control times for brake actuators in appropriate brake systems, for example, the brake actuators are influenced in such a way that they produce a given braking torque at the corresponding wheels.

With the subsystem controller (FLS) or control device 406, which affects the steering of the vehicle with its control actions, the front steering angle or the change in the front steering angle may be used as setpoint S2. This setpoint S2 is converted in a known way into corresponding signals AL for influencing steering actuator 413 with the help of the actuator control or means 412 for driving the actuators assigned to control device 406. Signal AL may be, for example, a pulse width modulated signal with which a motor contained in steering actuator 413 is influenced to set a steering angle.

It should be noted that it is also conceivable to use a subsystem controller which influences the steering angle on the rear axle of the vehicle.

Control device 407 is discussed below. Since the device according to the present invention is to be expandable at will with control devices, control device 407 is shown with dashed lines to illustrate this fact. Furthermore, in this connection it is indicated that control device 407 may contain any desired number of actuators. In the present embodiment, it shall now be assumed that the subsystem or control device 407 is a device for implementing chassis control, as described, for example, in the article "Ein Hochleistungskonzept zur aktiven Fahrwerkregelung mit reduziertem Energiebedarf" in the *Automobiltechnische Zeitschrift (ATZ)*, vol. 94, no. 7/8 (1992) pages 392–406. In this connection, it should be assumed that in the use of control device 407 for motor vehicle controlling, only actuators 416 are used as actuators.

Control device 407, which affects chassis actuators 416 of the vehicle with the control actions it implements, preferably delivers as setpoint S3 a value for the damper hardness or for the spring hardness or a value for the setpoint level to be set. Which setpoint S3 is selected will depend, among other things, on whether active or passive chassis control is used. Setpoint S3 is converted in a known way into corresponding signals A1 for influencing chassis actuators 416 with the help of the actuator control or means 415 to drive actuators assigned to control device 407. Actuators 416 may be, for example, a hydraulic actuator arrangement, a pneumatic actuator arrangement or electromagnetic actuators. The hydraulic or pneumatic arrangement includes various components, such as cylinders, valves or throttles. Depending on the type of chassis actuators used, signals A1 may be, for example, control signals for valves and/or throttles which are part of the hydraulic or pneumatic actuators, or these signals may be electric currents for the electromagnetic actuators.

The respective actuators are controlled or regulated by signals AL, AM or AB determined with the help of means 412 or 418 so that the setpoints determined with the help of controllers FZR and the values preselected by means ZF are set.

As an example of control device 407, FIG. 5 shows its internal structure in detailed form. This diagram also applies accordingly to control device 406.

Controller influencing means 414a receives quantities E3 which are generated with the help of system coordinator 404. Optionally quantities M representing the movement of the vehicle can also be sent to controller influencing means 414a. From quantities E3 and M supplied to it, controller influencing means 414a determines influencing quantities R3 which are sent to controller 414b and influence it. In addition to influencing quantities R3, quantities M representing the movement of the vehicle are also supplied to controller 414b. From quantities supplied to it, controller 414b determines setpoints SR3 which are sent to a logic element 419.

Quantities M representing the movement of the vehicle are supplied to means 414c for implementing an additional function ZF. Depending on these quantities, means 414c determines quantities SF3 which are sent to logic element 419.

With the help of logic element 419, quantities SR3 and SF3 are linked to quantities S3. This linkage may involve, for example, adding two quantities SR3 and SF3 to quantities S3. However, other types of linkage are also conceivable. For example, two quantities SR3 and SF3 may also be weighted relative to one another when linked to quantities S3.

From logic element 419, quantities S3 are sent to means 415 for driving actuators assigned to control device 407. In addition to quantities S3, quantities M representing the movement of the vehicle are also sent to means 415 for driving actuators assigned to control device 407. From the quantities supplied to it, means 415 determines signals A1 through A2 for driving actuators 416 through 417 assigned to control device 407.

In conclusion, it should be noted that the form of an exemplary implementation selected in the embodiment shown in FIGS. 4 and 5 is not intended to restrict the scope of the idea essential to the present invention in any way.

What is claimed is:

1. A device for controlling first quantities which represent a movement of a motor vehicle, the device comprising:
    a first arrangement detecting the first quantities;
    a plurality of control devices including actuators and implementing control actions independently of one another using the actuators, the control devices implementing the control actions to stabilize the motor vehicle from effects of the first quantities, the control devices having:
        at least one first device implementing first actions of the control actions and engaging with at least one of brakes and an engine of the motor vehicle using the first actions, and
        at least one of a second device and a third device, the second device implementing second actions of the control actions and engaging with a steering arrangement of the motor vehicle using the second actions, the third device implementing third actions of the control actions and engaging with chassis actuators of the motor vehicle using the third actions; and
    a second arrangement determining at least one of particular signals and second quantities as a function of the first quantities, the at least one of the particular signals and the second quantities being determined for at least temporarily influencing at least one particular device of the control devices to stabilize the motor vehicle,
    wherein the at least one particular device performs the control actions to stabilize the motor vehicle until the at least one particular device is affected by the at least one of the particular signals and the second quantities, the at least one particular device performing the control actions without being affected by the second arrangement.

2. The device according to claim 1, further comprising:
    a third arrangement receiving the first quantities and determining at least one of third quantities and fourth quantities, the third quantities representing a driving status of the motor vehicle and being determined as a function of the first quantities, the fourth quantities representing setpoints selected by a driver,
    wherein the third arrangement transmits at least one of the third quantities and the fourth quantities to the second arrangement for determining at least one of the particular signals and the second quantities.

3. The device according to claim 1, wherein the control devices include at least one of a controller arrangement and a fourth arrangement for driving the actuators which are assigned to respective ones of the control devices.

4. The device according to claim 3, wherein the controller arrangement receives the first quantities and the at least one of the particular signals and the second quantities, and generates at least one of further signals and fifth quantities as a function of the first quantities and the at least one of the particular signals and the second quantities.

5. The device according to claim 4, wherein the controller arrangement transmits the at least one of the further signals and the fifth quantities to the fourth arrangement for driving the actuators assigned to the respective ones of the control devices.

6. The device according to claim 4, wherein the fourth arrangement generates at least one of control signals and sixth quantities for driving the actuators assigned to the respective ones of the control devices as a function of at least one of:
the further signals, and
the fifth quantities and the first quantities.

7. The device according to claim 3, wherein the controller arrangement includes at least one of:
a controller influencing arrangement,
a controller implementing a control measure characteristic of the control devices, and
a fifth arrangement implementing further control actions.

8. The device according to claim 7, wherein the controller influencing arrangement determines at least one of additional signals and additional quantities as a function of at least one of the particular signals and the second quantities.

9. The device according to claim 8, wherein the controller influencing arrangement influences the controller which is assigned to the controller influencing arrangement using the at least one of the additional signals and the additional quantities.

10. The device according to claim 8, wherein the controller determines at least one of controlling signals and seventh quantities as a function of the first quantities and the at least one of the additional signals and the additional quantities, the at least one of the controlling signals and the seventh quantities being transmitted to the fourth arrangement for driving the actuators assigned to the respective ones of the control devices.

11. The device according to claim 7,
wherein the fifth arrangement implements the further control actions as a function of the first quantities and determines at least one of controlling signals and eighth quantities to be transmitted to the fourth arrangement for driving the actuators assigned to the respective ones of the control devices, and
wherein the at least one of the controlling signals and the eighth quantities is determined independently of the at least one of the particular signals and second quantities.

12. The device according to claim 1, wherein the at least one of the particular signals and the second quantities includes at least one of:
device signals which at least one of:
block at least one individual device of the control devices,
release the at least one individual device, and
influence an enablement of the at least one individual device,
ninth quantities for adjusting the control actions of the at least one individual device,
tenth quantities defining a system deviation value determined in the controller of the at least one individual device which influences the control actions,
eleventh quantities limiting the control actions,
twelfth quantities representing at least one setpoint for the controller, and
thirteenth quantities for at least one of preselecting and modifying a control procedure which is executed in the controller.

13. The device according to claim 12, wherein the ninth quantities include variable gain factors.

14. The device according to claim 12, wherein the tenth quantities include action threshold values.

15. The device according to claim 12, wherein the eleventh quantities are maximum threshold values.

16. The device according to claim 1, wherein the second device includes:
a controller arrangement which has a controller influencing arrangement, a controller for implementing steering measures to stabilize the motor vehicle and a third arrangement for implementing additional steering measures, and
a fourth arrangement for driving the steering actuator.

17. The device according to claim 1, wherein the at least one first device includes:
a controller arrangement having a controller influencing arrangement and a controller for implementing the first actions to stabilize the vehicle, the first actions being at least one of brake actions and engine actions, and
a third arrangement driving at least one of the brakes and the engine.

18. The device according to claim 1, wherein the third device includes:
a controller arrangement having a controller influencing arrangement, a controller implementing the respective third actions for stabilizing the motor vehicle and a third arrangement implementing additional chassis actions, and
a fourth arrangement driving the chassis actuators of the actuators.

19. A method for controlling first quantities representing a movement of a vehicle, comprising the steps of:
determining the first quantities using a first arrangement;
performing control actions with a plurality of control devices, one of the control devices performing the control actions independently from another one of the control devices as a function of the first quantities to stabilize the vehicle by utilizing actuators of the control devices;
influencing at least one of brakes and an engine of the vehicle using at least one first device of the control devices, the at least first device performing a first action of the control actions to influence the at least one of the brakes and the engine;
performing at least one of the following steps:
influencing a steering arrangement of the vehicle using at least one second device of the control devices, the at least one second device performing a second action of the control actions to influence the steering arrangement, and
influencing chassis actuators of the actuators of the vehicle using at least one third device of the control devices, the at least one third device performing a third action of the control actions to influence the chassis actuators;

determining at least one of particular signals and second quantities using a second arrangement as a function of the first quantities; and at least temporarily influencing at least one particular device of the control devices to stabilize the vehicle, wherein the at least one particular device performs the control actions to stabilize the vehicle until the at least one particular device is affected by the at least one of the particular signals and the second quantities, the at least one particular device performing the control actions without being affected by the second arrangement.

20. A device for controlling first quantities which represent a movement of a motor vehicle, the device comprising:

a first arrangement detecting the first quantities;

a second arrangement performing at least one of:
determining second quantities representing a driving status of the motor vehicle, and
determining third quantities representing setpoints selected by a driver as a function of the first quantities, a third arrangement determining fourth quantities as a function of at least one of the second quantities and the third quantities for at least temporarily influencing a plurality of control devices, each of the control devices performing control actions to stabilize the vehicle using actuators of the control devices as a function of at least one of the first quantities and the fourth quantities, one of the control devices performing the control actions independently from another one of the control devices, wherein at least one first device of the control devices influences at least one of brakes and an engine of the vehicle, the at least one first device performing a first action of the control actions to influence the at least one of the brakes and the engine, wherein the control devices include at least one of a second device and a third device, the second device influencing a steering arrangement of the vehicle by performing a second action of the control actions, the third device influencing chassis actuators of the actuators of the vehicle by performing a third action of the control actions, wherein the control devices include at least one corresponding controller arrangement which generates particular signals for driving a fourth arrangement provided in at least one respective device of the control devices, the fourth arrangement controlling the actuators assigned to the at least one respective device, and wherein the at least one corresponding controller arrangement includes at least one of:
at least one controller for stabilizing the vehicle,
a controller influencing arrangement, and
a fifth arrangement for implementing additional actions.

21. A device for controlling first quantities which represent a movement of a motor vehicle, the device comprising:

a first arrangement detecting the first quantities;

a plurality of control devices including actuators and implementing control actions independently of one another using the actuators, the control devices implementing the control actions to stabilize the motor vehicle from effects of the first quantities, at least one first device of the control devices influencing a steering arrangement of the vehicle, the at least one first device performing a first action of the control actions to influence the steering arrangement, at least one second device of the control devices influencing chassis actuators of the actuators of the vehicle by performing a second action of the control actions, a second arrangement determining at least one of particular signals and second quantities as a function of the first quantities, wherein the control devices at least temporarily influences at least one particular device of the control devices to stabilize the vehicle, and wherein the at least one particular device performs the control actions to stabilize the vehicle until the at least one particular device is affected by the at least one of the particular signals and the second quantities, the at least one particular device performing the control actions without being affected by the second arrangement.

* * * * *